(12) United States Patent
Todd

(10) Patent No.: US 6,179,240 B1
(45) Date of Patent: Jan. 30, 2001

(54) ERGONOMIC FLY TYING BOBBIN

(75) Inventor: Cecelia L. Todd, Roseburg, OR (US)

(73) Assignee: Umpqua Acquisition Corp, Glide, OR (US)

( * ) Notice: Under 35 U.S.C. 154(b), the term of this patent shall be extended for 0 days.

(21) Appl. No.: 09/436,188

(22) Filed: Nov. 8, 1999

(51) Int. Cl.$^7$ .................................................. A01K 97/26
(52) U.S. Cl. .................. 242/442; 242/588.2; 242/129.53
(58) Field of Search .............................. 242/439.2, 442, 242/423.2, 588, 588.2, 129.51, 129.53; 289/17; 140/123, 124

(56) References Cited

U.S. PATENT DOCUMENTS

| | | |
|---|---|---|
| 2,220,878 | 11/1940 | Harvey . |
| 2,479,710 | 8/1949 | Arnold . |
| 2,487,625 * | 11/1949 | Witkovic ........................ 242/129.53 |
| 2,578,045 * | 12/1951 | Conrad et al. .................. 242/129.53 |
| 2,659,548 * | 11/1953 | Morgester ...................... 242/129.53 |
| 2,798,681 | 7/1957 | Beverino . |
| 4,189,111 | 2/1980 | Doiron . |
| 4,418,875 * | 12/1983 | Brine ................................... 242/442 |
| 4,462,551 | 7/1984 | Bloch . |
| 4,870,772 * | 10/1989 | Johns ..................................... 289/17 |
| 5,076,510 | 12/1991 | Norlander . |
| 6,012,605 * | 1/2000 | Miloscia ............................... 242/588 |

OTHER PUBLICATIONS

Cabela's, p. 56, item FF, 1999.

* cited by examiner

*Primary Examiner*—Katherine A. Matecki
(74) *Attorney, Agent, or Firm*—Klarquist Sparkman Campbell Leigh & Whinston, LLP

(57) ABSTRACT

A fly tying bobbin for holding a spool of thread and guiding thread supplied from the spool includes a flat sided holding portion, a pair of opposed spool holding arms and a pair of opposed spool bearing elements. The holding portion is adapted to be held between the thumb and forefinger and to orient the bobbin. The opposed spool holding arms extend from respective attachment points on the holding portion. The attachment points are spaced from each other and define a first axis parallel to the sides. The pair of opposed spool bearing elements are positioned at respective free ends of the pair of spool bearing arms. The spool bearing elements are engagable with respective end surfaces of the spool to rotatably support the spool. The spool bearing elements define a second axis passing therethrough about which the spool is rotatable. The second axis and the first axis are substantially perpendicular.

14 Claims, 2 Drawing Sheets

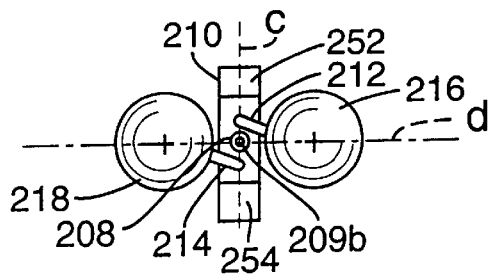
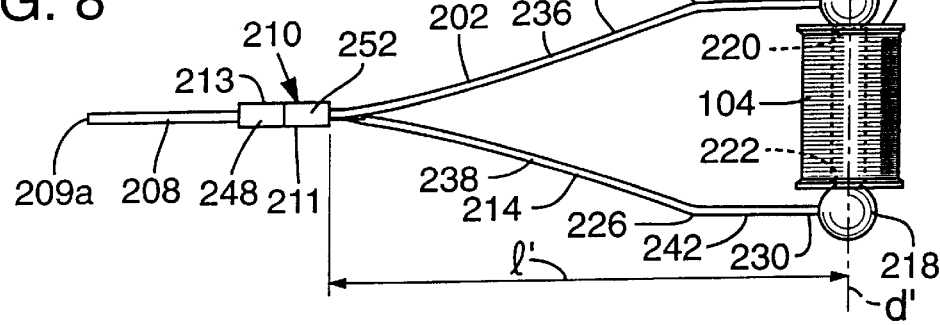
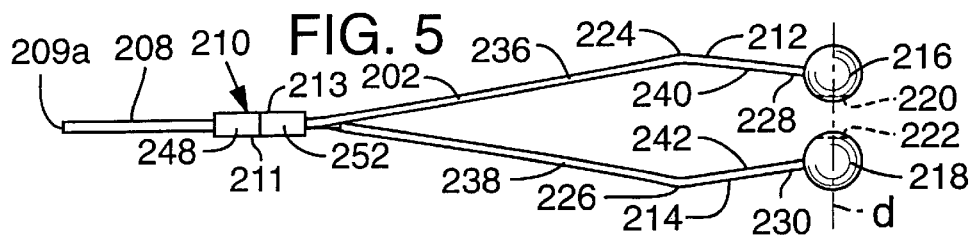
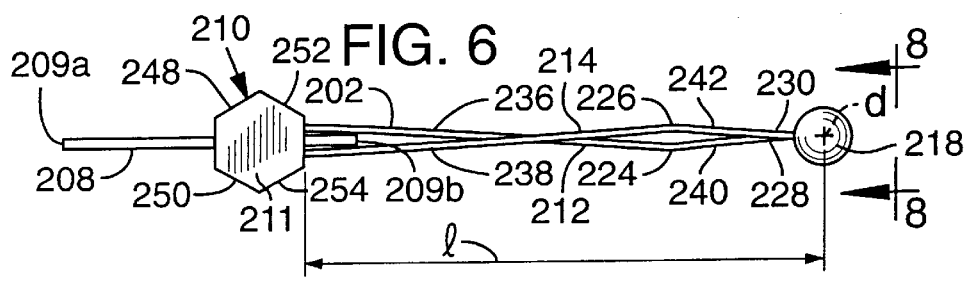
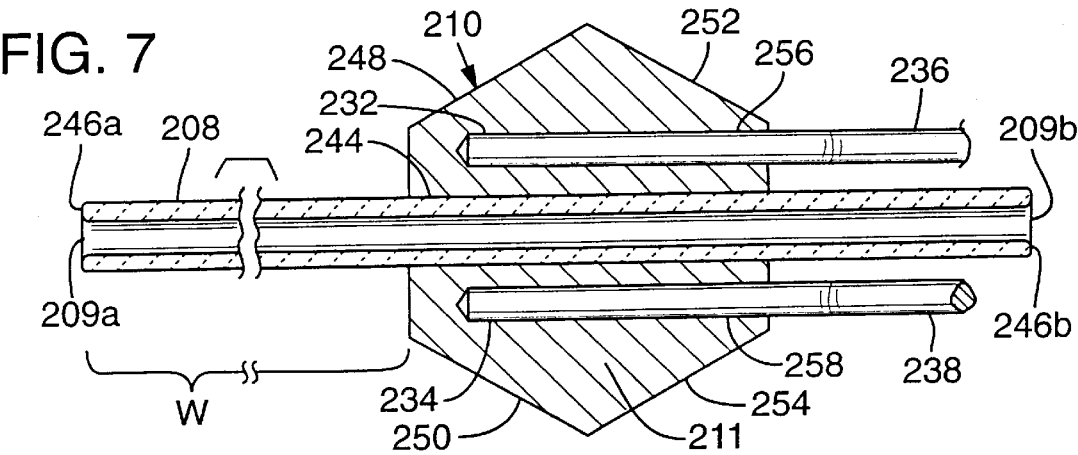

ERGONOMIC FLY TYING BOBBIN

FIELD

The present invention relates to an ergonomic bobbin used to hold a spool of thread and to feed the thread while tying artificial fishing flies.

BACKGROUND

Fly tying bobbins are used to a hold a spool of thread or other material (e.g., floss), and to feed and manipulate the thread under sufficient tension while tying flies.

A conventional bobbin as used heretofore has a frame with pair of opposing arms that rotatably support a spool of thread. The arms are joined at a holding portion. A guide tube that extends from the holding portion receives thread from the spool and allows the user to guide the thread, e.g., in winding the thread onto a hook shank. The conventional bobbin is configured such that one of the end surfaces of the spool contacts the user's palm when the bobbin is held.

It is an object of the invention to provide a bobbin construction that provides the same or greater functionality than conventional bobbins, yet is more convenient and comfortable to use.

SUMMARY

According to the invention, a fly tying bobbin for holding a conventional thread spool and guiding thread supplied from the spool includes a holding portion adapted to be held between a user's thumb and forefinger during use of the bobbin, thereby orienting the bobbin. A pair of opposed spool holding arms extend from the holding portion, and opposed spool bearing elements are positioned at respective free ends of the spool holding arms, the spool holding arms being so formed that the cylindrical surface of a spool rather than an end of the spool contacts the user's palm.

BRIEF DESCRIPTION OF THE DRAWINGS

FIG. 4 is a top view of the bobbin of FIG. 2.

FIG. 5 is a top view of the bobbin of FIG. 2, except without a spool of thread.

FIG. 6 is a side view of the bobbin of FIG. 5.

FIG. 7 is a partial sectional view of the holding portion of the bobbin of FIG. 5.

FIG. 8 is an end view of the bobbin of FIG. 5.

DETAILED DESCRIPTION

Figure 1:
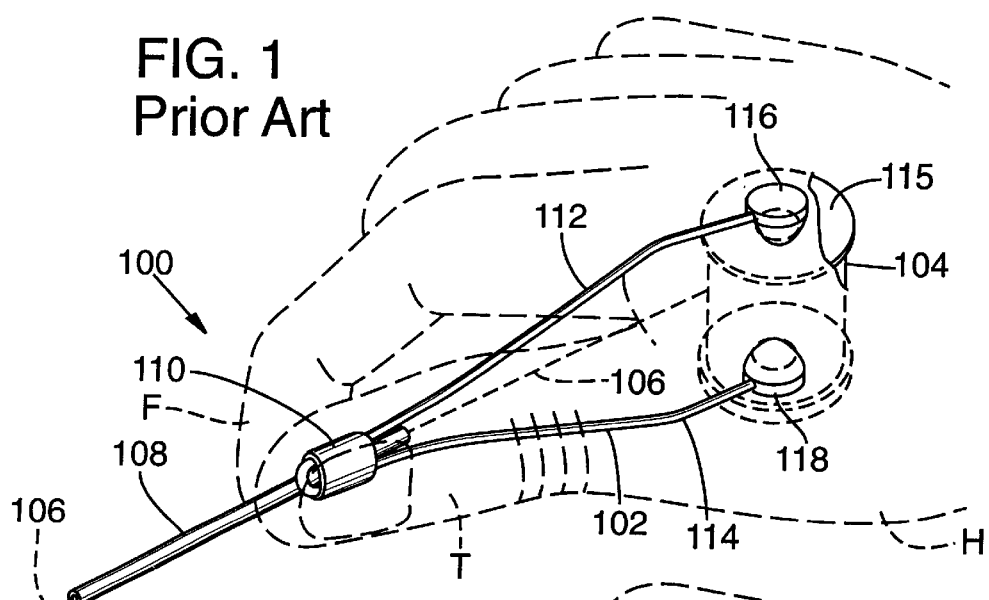
FIG. 1 is a perspective view of a conventional fly tying bobbin showing the bobbin being held during use.

As illustrated in FIG. 1, a conventional bobbin 100 has a frame 102 for rotatably supporting a spool 104 of thread 106. The thread 106 is fed from the spool 104 through a hollow guide tube 108. During use of the bobbin 100, e.g., in wrapping the shank of a fish hook (not shown), the thread 106 is pulled from a working end of the guide tube 108. As the thread 106 is pulled, the spool 104 rotates and additional thread 106 is fed.

The frame 102 has a holding portion 110 comprising an elliptical tube adapted to be held between the thumb and forefinger of a user, and a pair of opposed spool holding arms 112, 114 that lie in a plane parallel to the flattened sides of the holding portion 110. The spool holding arms 112, 114 extend from the holding portion 110 and have respective spool bearing members 116, 118 attached at their free ends. The spool bearing members 116, 118 engage holes in the opposite end surfaces (one being shown at 115) of the spool 104 defined by the axial spool hole. The spool holding arms 112, 114 are formed of a resilient material (typically stainless steel) and are shaped such that they must be stretched apart to accommodate the spool 104.

During use, the bobbin 100 is held with the holding portion 110 between a user's thumb T and a forefinger F (e.g., as shown in FIG. 1 for a right hand H). With the conventional bobbin 100, one of the spool holding arms 112, 114 and the associated end surface 115 of the spool 104 contact the user's palm during use. For some fly tyers, the action of the rotating end surface 115 and the pressure of the spool holding arm 112 against the palm of the hand H is uncomfortable, especially during periods of prolonged use of the bobbin 100.

In another type of conventional bobbin (not shown) manufactured by Guidebrod, a specially designed spool is oriented to rotate on an axis parallel to the guide tube. This bobbin construction, however, cannot be used with conventional spools of thread, e.g., the spool 104.

According to the invention, a new bobbin construction is provided that is more convenient and comfortable to hold and use. More specifically, the new construction permits the bobbin to be held and used such that the circumferential surface of the spool, rather than the end surface, contacts the palm.

Figure 2:
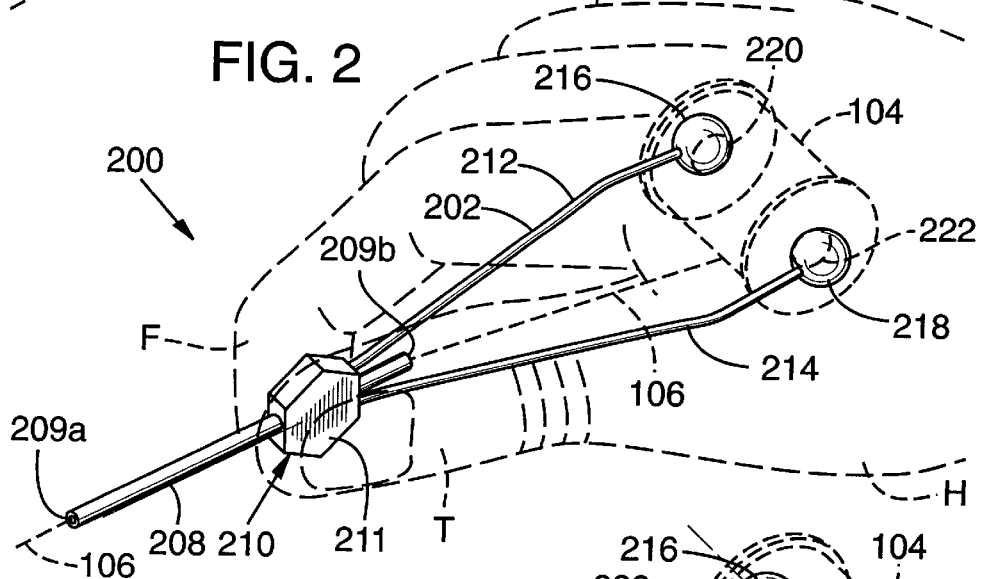
FIG. 2 is a perspective view of a bobbin according to the invention showing the bobbin being held during use.
Figure 3:
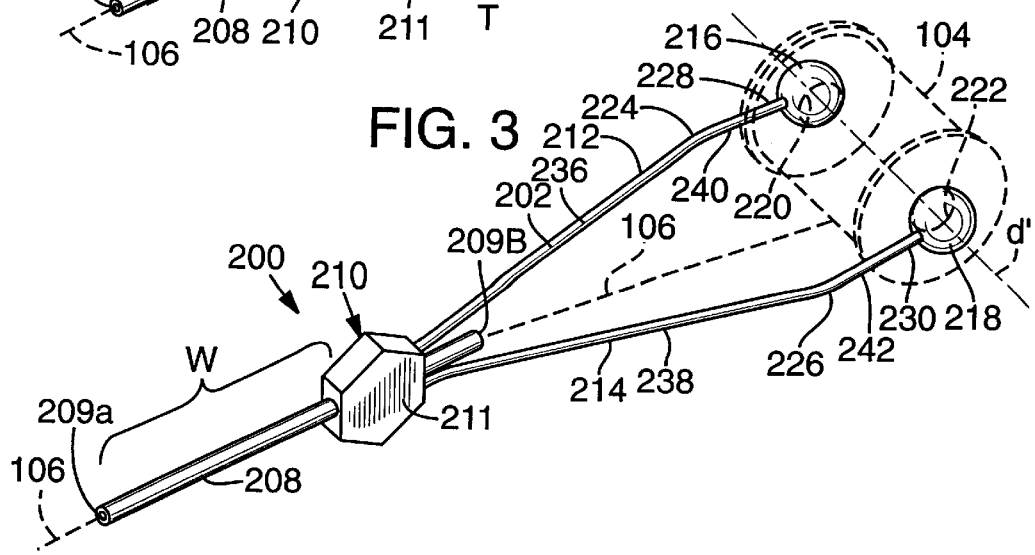
FIG. 3 is perspective view of the bobbin of FIG. 2.

A specific implementation of a new bobbin 200 according to the invention is shown in FIGS. 2–8. As shown in FIGS. 2–4, the bobbin 200 has a frame 202 with spool holding arms 212, 214 that extend from a holding portion 210 at points above and below, respectively, a rear portion of a guide tube 208 projecting through the holding portion 210. The holding portion 210 has parallel, opposing flat side surfaces 211 and a hexagonal peripheral edge 213.

The spool holding arms 212, 214 are identical to each other in configuration. The spool holding arms 212, 214 have free ends 228, 230, respectively, to which are attached, e.g., by an adhesive, respective spool bearing elements, which, in the illustrated implementation are spheres 216, 218. The spheres 216, 218 define respective bearing surfaces 220, 222 that receive and rotatably support the spool 104 by engaging in the opposite ends of the axial spool hole. As the bobbin 200 is shown in FIGS. 6 and 7, the spool holding arm 212 that extends from the holding portion 210 above the guide tube 208 includes a first section 232 fixed in the holding portion and that extends parallel to the guide tube 208 and a second section 236 that projects angularly downward. Similarly, the spool holding arm 214 that extends from the holding portion 210 below the guide tube 208 includes a first section 234 fixed in the holding position and that extends parallel to the guide tube 208 and a second section 238 that projects angularly upward.

The second section 236 of the spool holding arm 212 is joined at an elbow 224 to an angularly upward projecting third section 240, which terminates in the free end 228. Similarly, the second section 238 of the spool holding arm 214 is joined at an elbow 226 to an angularly downward projecting third section 242, which terminates in the free end 230. In this way, the spheres 216, 218 are positioned with their coincident axes extending substantially perpendicular to a plane parallel to the holding portion side surfaces 211.

As shown most clearly in FIGS. 5 and 6, the spheres 216, 218 have coincident axes that are horizontally aligned along an axis d when the bobbin 200 is viewed from the side with the bobbin oriented so that the holding portion surfaces 211 are vertical. The axis d is parallel to an axis d', which is defined by the coincident axes of the spheres 216, 218 with the spool 104 inserted therebetween, the axis d' being positioned slightly leftward of the axis d toward the holding portion 210, as the bobbin is shown in FIG. 4.

As best shown in FIGS. 6 and 8, the spool holding arms 212, 214 are "twisted" when compared to the spool holding arms 112, 114 of the conventional bobbin 100. That is, the bobbin 200 is configured such that the end surfaces 215 of the spool 104 held thereby are approximately perpendicular to the palm of the user during use of the bobbin 200, as shown in FIG. 2, so that the cylindrical surface of the thread spool 104 engages the user's palm, as best shown in FIG. 2. As stated, the spool holding arms 212, 214 are identical to each other, and are also symmetrical with respect to each other about an axis extending through the guide tube 208.

Again referring to FIG. 8, the line c, which extends approximately vertically, lies in a plane defined by the axis of the guide tube 208, the median plane of the holding portion 210, and the axes of the fixed end sections 232, 234 of the spool holding arms 212, 214, respectively. Thus, in the position shown, the fixed sections 232, 234 of the spool holding arms 212, 214 are vertically aligned, whereas the free ends 228, 230 of the spool holding arms 212, 214 are substantially horizontally aligned (i.e., the spheres 216, 218 are aligned along the axis d or the axis d').

Referring to FIG. 6, the axis d is spaced by a distance l from a rearmost edge surface of the holding portion 210 (i.e., the position of the line c). For the particular configuration shown, which is dimensioned for a standard-sized spool of thread, the distance l is approximately 2 5/16 inches. For the same configuration with the spool 104 inserted between the spool holding arms 212, 214, the axis d' is spaced by a distance l' of approximately 2 1/4 inches, as shown in FIG. 4. Of course, the bobbin can be configured to hold other sizes of spools, in which case the distances l and l' would change accordingly.

The opposing flat side surfaces 211 of the holding portion 210 are sufficiently sized for a user conveniently to hold and to manipulate the bobbin 200 during use. As noted previously, the holding portion 210 is shaped as a hexagonal solid. Forward edge surfaces 248, 250 and rearward edge surfaces 252, 254 provide additional points by which the bobbin 200 can be held and manipulated (e.g., using the thumb T and/or the forefinger F) during use.

As shown in FIG. 7, the guide tube 208 is positioned within an aperture 244 extending through the holding portion 210. The guide tube 208 is preferably secured in place using an epoxy adhesive or other suitable material. The guide tube 208 is positioned within the holding portion 210 such that a forward end 209a extends by a desired working length W from the holding portion 210. A rearward end 209b of the guide tube 208 projects toward and receives the thread 106 from the spool 104. The forward and rearward ends are both chamfered to prevent damage to the thread 106. The guide tube 208 is preferably constructed of a ceramic material for wear resistance.

As also shown in FIG. 7, the fixed end 232 of the spool holding arm 212 is inserted into a bore 256 in the holding portion 210 above and parallel to the bore 244. The fixed end 234 of the spool holding arm 214 is inserted into a bore 258 in the holding portion 210 also parallel to the bore 244, but below the latter. The fixed ends 232, 234 are secured within the respective bores 256, 258 using any suitable means, such as, e.g., by brazing or with a suitable adhesive.

In operation, the spool holding arms 212, 214 are spread apart from their relaxed positions (FIG. 5), and the spool 104 is inserted therebetween with the bearing surfaces 220, 222 centered in the holes in the end surfaces of the spool 104. The round periphery of each of the spheres 216, 218 allows the spool end surfaces to be slid laterally until the spheres 216, 218 engage the holes in the end surfaces. Because of the configuration of the spool holding arms 212, 214, the spool 104 is positioned to rotate on an axis that is approximately perpendicular to the planes of the holding portion side surfaces 211. A sufficient amount of thread 106 is fed from the spool 104, through the rear guide tube end 209b and out the forward guide tube end 209a. A thread delivery direction defined by the guide tube 208 is approximately perpendicular to the rotation axis of the spool 104.

In use, the free end of the thread 106 extending out of the guide tube 208 is attached to an object, e.g., a hook shank. The bobbin 200 is then held in the hand H between the thumb T and the forefinger F and the thread 106 is wound around the hook shank by rotating the bobbin 200 around the shank. Additional thread is pulled from the spool 104, which causes the spool 104 to rotate. Because the relatively broad and flat circumferential surface of the spool 104 rests against the palm of the hand H, the rotating action of the spool 104 is not uncomfortable to the user.

The frame 202 of the bobbin 200 is preferably formed of stainless steel. The holding portion 210 and the spheres 216, 218 are preferably formed of brass. As would be known to those of ordinary skill in the art, other suitable materials could be used. While spheres are preferred for engaging in the thread spool aperture because their securement to the holding arms 212, 214 does not require a specific orientation of the spheres and the surfaces thereof do not present any edges to the hand, other spool engaging elements could be utilized, such as, for example, the elements 116, 118 of the illustrated prior art bobbin.

Having illustrated and described the principles of the invention with reference to a preferred embodiment, it should be apparent to those of ordinary skill in the art that the invention may be modified in arrangement and detail. I claim as my invention all such modifications that fall within the scope of the following claims.

What is claimed is:

1. A fly tying bobbin for holding a spool of thread and guiding thread supplied from the spool, comprising:
    a holding portion adapted to be held during use of the bobbin;
    a pair of opposed spool holding arms extending from the holding portion at respective attachment points on the holding portion and having free ends, the attachment points being spaced from each other and defining a first axis; and
    a pair of opposed spool bearing elements positioned at the respective free ends of the spool bearing arms, the spool bearing elements being engageable with respective end surfaces of a spool to rotatably support a spool and defining a second axis passing therethrough about which a spool is rotatable,
    wherein the second axis and the first axis are non-parallel.

2. The bobbin of claim 1, wherein the first axis and the second axis are approximately perpendicular.

3. The bobbin of claim 1, wherein the holding portion includes at least one pair of opposed side surfaces.

4. The bobbin of claim 3, wherein the opposed side surfaces are substantially flat.

5. The bobbin of claim 3, wherein the side surfaces each have a hexagonally-shaped edge.

6. The bobbin of claim 3, wherein the holding portion includes at least one edge surface extending between the side surfaces, and wherein the attachment points of the spool holding arms are disposed on the edge surface.

7. The bobbin of claim 3, wherein the second axis is approximately perpendicular to the side surfaces.

8. The bobbin of claim 1, wherein the holding portion includes at least one pair of parallel side surfaces.

9. The bobbin of claim 1, wherein each of the pair of spool holding arms is substantially identical to the other.

10. The bobbin of claim 1, wherein each spool bearing element is substantially spherical.

11. The bobbin of claim 1, wherein the pair of opposed spool holding arms each comprise angularly disposed sections joined at elbows.

12. The bobbin of claim 1, wherein the holding portion includes a guide tube that defines a thread delivery direction, the guide tube having a receiving end that receives the thread from the spool and a working end through which a free end of the thread extends, and wherein the thread delivery direction is approximately perpendicular to the second axis.

13. The bobbin of claim 12, wherein the attachment points are positioned on opposite sides of the guide tube.

14. A fly tying bobbin for holding a cylindrical spool of thread having an axial hole and guiding the thread supplied from the spool, comprising:

a holding portion adapted to be held during use of the bobbin, the holding portion having opposing, substantially parallel side surfaces with a hexagonal edge and pairs of opposing edge surfaces extending between the side surfaces, one edge surface having a pair of spaced apart bores disposed therein, a cylindrical aperture having a longitudinal axis extending through said holding portion from one said edge surface to the opposing edge surface, the bores being positioned on opposite sides of the aperture, the longitudinal axis of said aperture being a first axis;

a guide tube secured in and extending through said aperture and having a rearward exposed portion extending towards the spool that receives the thread from the spool and a forward exposed portion extending forwardly of the holding portion that feeds the thread; and a pair of opposed spool holding arms each having a fixed end inserted in a respective one of the bores, a first exposed portion extending angularly outward from the fixed end and angularly away from the other of said arms, a second exposed portion extending angularly from the first exposed portion and toward the other of said arms, and a free end opposite the fixed end, each free end having an attached sphere that includes a bearing surface engageable in the axial hole at one end of the spool, the bearing surfaces facing one another and having coincident axes that define a second axis extending therebetween, and the second axis being substantially perpendicular to the first axis, whereby the axis of a thread spool mounted between said bearing surfaces will be substantially perpendicular to said first axis.

* * * * *